United States Patent [19]

Buhl et al.

[11] Patent Number: 4,577,987
[45] Date of Patent: Mar. 25, 1986

[54] BALL AND SOCKET JOINT

[75] Inventors: Reihard Buhl, Bohmte; Paul Westphal, Lemförde, both of Fed. Rep. of Germany

[73] Assignee: Lemförder Metallwaren AG, Fed. Rep. of Germany

[21] Appl. No.: 603,589

[22] Filed: Apr. 25, 1984

[30] Foreign Application Priority Data

Apr. 29, 1983 [DE] Fed. Rep. of Germany ....... 3315658

[51] Int. Cl.⁴ ............................................. F16C 11/06
[52] U.S. Cl. .................................................... 403/133
[58] Field of Search .............. 403/133, 140, 135, 139, 403/132, 138

[56] References Cited

U.S. PATENT DOCUMENTS 2,754,141  7/1956  Latzen ............................ 403/140 X
3,211,483  10/1965  Sullivan, Jr. ........................ 403/140
4,431,328  2/1984  Smith .............................. 403/132 X

FOREIGN PATENT DOCUMENTS 952646  3/1964  United Kingdom ................ 403/140

Primary Examiner—Andrew V. Kundrat
Attorney, Agent, or Firm—McGlew and Tuttle

[57] ABSTRACT

A ball and socket joint, particularly a track rod joint for motor vehicles comprises a casing, a ball stud with a spherical head, and a socket received in the casing and being made of a material having a limited elasticity. At a flat polar surface of the spherical head, the socket is provided with an annular area which applies under biasing load against the flat polar surface and, upon an angular displacement of the ball stud, produces a restoring torque.

4 Claims, 2 Drawing Figures

BALL AND SOCKET JOINT

FIELD AND BACKGROUND OF THE INVENTION

This invention relates in general to pivotal joint construction and in particular to a new and useful ball and socket joint particularly a track rod joint for motor vehicles.

An inner socket made of a material having a limited elasticity yet excellent anti-friction properties, such as a plastic of other material with such properties, and capable of being given a shape by curing in a mold, forms the bearing of a ball stud which protrudes from the casing at one side while a cover is provided at the opposite side. Frequently, the socket inserted in the casing is in addition biased by the cover, so that it encloses the ball head under a biasing load which may be predetermined by varying the material structure, or, for example, by properly dimensioning the parts. The torque to be overcome during an angular movement of the joint and produced by the friction between the surface of the ball stud and the inside of the socket, is proportional thereto.

It is known to provide grooves in the socket of spherical joints, for supplying and receiving a lubricant, (German Pat. No. 11 05 738), and to reduce cross sections to obtain a certain elasticity between the bearing zones and the socket in the range of the ball head (European Pat. No. 0020214). For ball and socket joints, it is further known to provide outer annular areas on an integral or multi-part socket, and to keep these areas by an inserted cover under biasing load increasing the friction between the spherical head and socket and reducing play under strong loads, and/or compensating for wear (German No. AS 12 92 952). Finally, known are ball and socket joints comprising a metallic socket which is braced within the casing by elastic buffer elements and in which a restoring torque counteracts the frictional torque during a movement of the joint (German No. AS 10 52 754). This restoring movement is produced by a spring which is clamped between the cover and a plane surface parallel thereto of a ball head cut about in its equatorial plane, so that during angular movements of the ball stud relative to the casing, the unilaterally loaded spring produces a force acting on the place surface of the ball head as a restoring torque. Flattened ball heads in ball and socket joints are also known from other publications.

The invention is directed to a pivotal joint in which during a movement of the joint, a restoring torque counteracting the movement is produced by the strain of the socket material.

In accordance with the invention, a ball and socket joint particularly a track rod joint for motor vehicles comprises a casing with a ball stud having a sphereical head extending into the casing and having a plane extending completely through the ball head forming a flat polar surface adjacent an end thereof. A socket of a material having a limited elasticity is located within the casing and surrounds the spherical head. The socket has an angular socket bearing surface engaged on the flat polar surface of the ball head and it has a recess extending into the annular surface limiting the bearing zone of the spherical head. The casing is closed by a cover which biases the socket material against the flat polar surface.

The socket is advantageously made with an exterior surface which faces the cover formed with a peripheral annular area which is parallel to the cover surface and an outer peripheral area which in a non-bias state slopes downwardly and outwardly. The socket advantageously forms a planar back area parallel to an adjacent cover of a rectangular cross section. The construction leaves a planar polar surface of the head which is parallel to the cover which is clamped between the cover and the flat surface of the ball head by a portion of the socket member.

Such a design makes it unnecessary to provide an additional component part, such as a spring, to obtain a restoring torque opposing the angular displacement of the ball stud relative to the casing. The desired restoring torque is now simply produced by a particular shape of the socket and a correspondingly designed spherical head, thus does not require any additional manufacturing costs. The restoring torque increases with the angle of tilt of the ball stud, and the deflection is thus opposed by an increasing resistance. This, however, does not unfavorably affect the rotary movements of the spherical head into its zero position.

Accordingly, it is an object of the invention to provide an improved pivotal joint which includes a ball stud having a ball head portion which is engaged in a casing against an elastic socket member which bears between a flat headed end of the ball head and a cover.

A further object of the invention is to provide a ball and socket joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
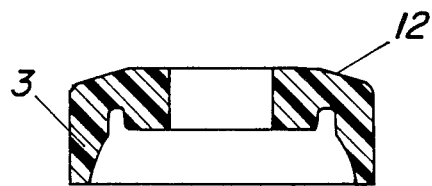
FIG. 2 is a similar sectional view of a half-socket before the assemblage.

Referring to the drawings, in particular the invention embodied therein comprises a ball and socket joint particularly a track rod joint for motor vehicles which comprises a casing 1 having a hollowed end portion into which a ball head portion 5 of a ball stud 2 extends. The ball head 5 has a flat planar surface 9 which includes an annular thrust area 10 which is covered by a portion of a socket member 3, which is made of a material having a limited elasticity. A flat surface 9 extends in a plane which may be considered to be an equatorial plane which extends completely through the spherical head 5. The socket member 3 is biased against the annular thrust area 10 by a cover 6 closes the casing 1.

Figure 1:
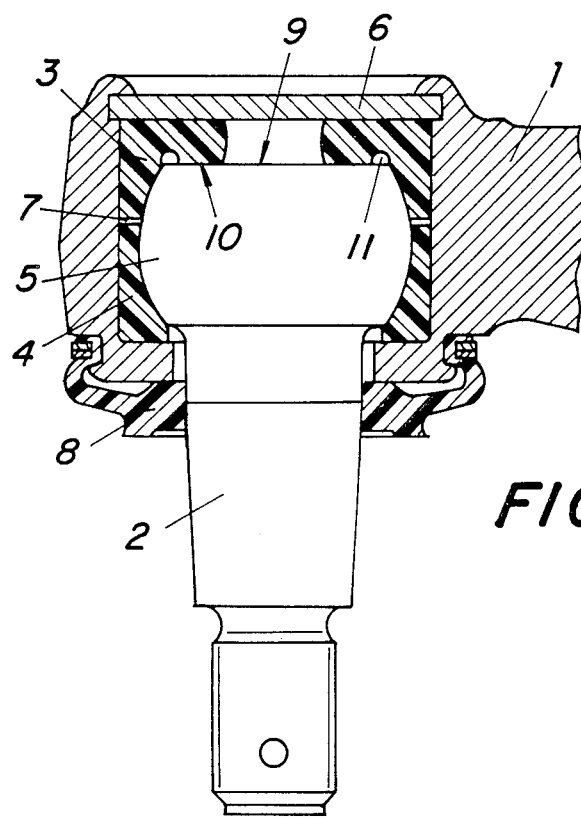
FIG. 1 is a meridional sectional view of a ball and socket joint.

FIG. 1 shows a joint comprising a casing 1, a ball stud 2, and a socket formed by two half-sockets 3 and 4. Ball stud 2 includes a spherical head 5 which is seated in half-sockets 3,4 and is enclosed along with them by the casing 1 which is closed with a cover 6. The gap between half sockets 3 and 4 may be filled with a lubricant. At the side where the ball stud projects out of the casing an elastic packing ring 8 is provided.

Spherical head 5 is a zonal segment symmetrical about the equatorial plane and bounded at the side of cover 6 by a planar surface 9. Opposite thereto, the socket, in the shown example half-socket 3, is provided with a circular thrust surface area 10 applying against surface 9 under the biasing load which is exerted by cover 6. Advantageously, thrust area 10 is formed by an encircling recess 11 of half-socket 3, and the respective portion of the half socket has the shape of a ring having a substantially rectangular cross section and being limited on its inside and outside, respectively, by the thrust area 10 and a back area applying against cover 6. It is advisable to provide a cover which is planar on its inside, and an also planar opposite surface 9. In a particular embodiment, half-socket 3 is provided on its side facing cover 6 with a peripheral annular surface area 10 which extends between the back of the ring portion including area 10, and the cylindrical outer surface of the half-socket, and which, in unstrained state, slopes down from the inside to the outside. This produces the effect that upon closing casing 1 with cover 6, the ring portion having a rectangular cross section of half socket 3, is loaded by cover 6 more than the portion limited by surface area 12, as illustrated in FIG. 2. The difference in loading of these two areas or portions depends on the slope of surface area 12. Recess 11 improves the elastic behaviour in the transition zone between the fully loaded ring portion and the peripheral portions of the body of half socket 3. At the same time, recess 11 may be filled with a lubricant. The extension at right angles of the surfaces limiting the portion producing the restoring torque of half socket 3 is specific to the shown embodiment. Other designs may be provided to produce the same effect. More particularly, single-part, or more than 2-part, sockets may be properly shaped for this purpose by molding or machining.

While specific embodiments of the invention have been shown and described in detail to illustrate the application of the principles of the invention, it will be understood that the invention may be embodied otherwise without departing from such principles.

What is claimed is:

1. A ball and socket joint, particularly a track rod joint for motor vehicles, comprising a hollow cylindrical casing having an opening at one end and having an opposite end, a ball stud having a spherical ball head located within said casing and having a flat polar top surface adjacent the opposite end of said casing, a ring-shaped socket member having an annular portion engaged around a portion of said spherical ball head and having a top end portion overlying the flat polar top surface of said ball stud, and a cover engaged peripherally against the interior of said casing and held by said casing into compressive engagement with said end portion, said ring-shaped socket member forming an annular thrust area radially spaced from said annular portion and extending axially from said end portion and with a free end substantially parallel to said cover and kept under biasing load by said cover.

2. A ball and socket joint according to claim 1, wherein said socket member comprises a peripheral annular area which extends between said cover and said flat polar surface, the exterior of said socket member including an annular radially inward area which is substantially parallel to said cover and said flat polar surface and an outer annular area which slopes outwardly and downwardly in respect to said cover.

3. A ball and socket joint according to claim 1, wherein said flat polar surface is parallel to said cover and wherein said socket member includes an annular portion clamped between said cover and said flat polar surface under elastic deformation.

4. A ball and socket joint according to claim 3, wherein said socket member includes first portion overlying said flat polar surface and a portion of said ball head and a second portion overlying a remaining portion of said ball head.

* * * * *